Patented Dec. 22, 1931

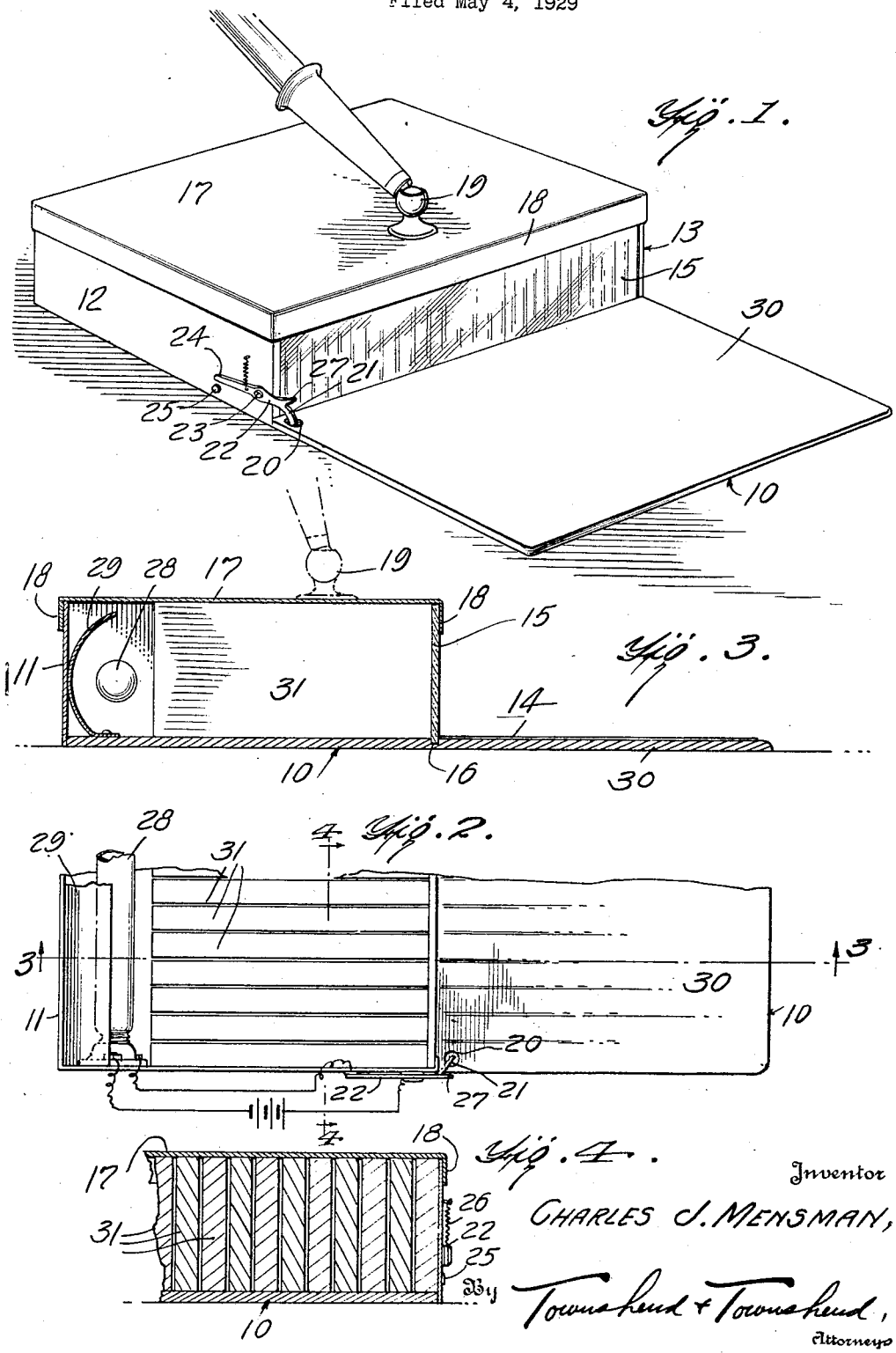

1,837,979

UNITED STATES PATENT OFFICE

CHARLES J. MENSMAN, OF WASHINGTON, DISTRICT OF COLUMBIA

METHOD AND MEANS FOR OPTICAL SIMULATION OF RULED LINES

Application filed May 4, 1929. Serial No. 360,540.

This invention has broadly as an object the provision of a method and means for optical simulation of ruled lines by means of rays of light, upon any object where the physical presence of lines is objectionable.

The most useful application of the principles occurring to me at the present time is in connection with stationery appliances, being concerned with the provision of means for projecting spaced lines of light upon a sheet of letter paper as an aid to a proper spacing in the body of a letter being written thereon. Conventional letter paper at the present time is provided as blank sheets having no lines of ruling thereon and it is sometimes a difficult matter in writing a letter to keep the lines properly spaced so as to provide a neat, attractive appearance to the body of the letter. The use of ruled paper would accomplish this result but such use is unthinkable except in the comparatively few instances wherein it is provided as a means of practice in letter writing such as in schools and the like.

In this application of its use, the invention is intended to provide an attractive desk unit adaptable for use in hotel lobbies, club writing rooms, and the like, being capable of suitable ornamentation so as to provide an efficient easily portable desk unit which may be made up in accordance with the color scheme of its surroundings.

Objects of the invention are: to provide a desk unit in the form of a portable blotter pad of a size suitable for placing a sheet of letter paper thereon and which is provided with means for optical projection of spaced lines across the body of the paper to provide a guide for writing placed thereon; to provide a device of this character having means for projecting a spaced series of light rays across a sheet of paper to simulate lines of ruling thereon; to provide a device of this character having a self-contained light source for projecting spaced rays of light across a sheet of paper to simulate lines of ruling thereon and having switch means for the light source controllable by movement of a sheet of paper over the device; and generally to provide a portable desk unit provided with means for projecting a plurality of lines of light across a sheet of paper and onto the surface thereof in simulation of spaced ruling lines as an aid to the proper guidance of writing to be placed on the sheet.

With these and such other objects in view as will be apparent from the description, the invention resides in the novel combination, construction and arrangement of parts hereinafter described and claimed and illustrated in the accompanying drawings wherein is shown a practical, physical embodiment of the principles underlying the invention.

Figure 1 is a perspective of a unit constructed in accordance with the invention.

Figure 2 is a fragmentary plan view thereof with the cover removed.

Figure 3 is a vertical section on the line 3—3 of Figure 2.

Figure 4 is a fragmentary section on the line 4—4 of Figure 2.

In its broad aspects the invention consists of a flat base 10 of rectangular configuration and preferably having such dimensions as to approximate the ordinary blotter pads which are generally an equipment of all writing desks as employed in hotel lobbies, club rooms and the like. The base 10 is provided at one side edge with an upright wall 11 which cooperates with end walls 12 and 13 to provide a three sided container secured to the base having an area approximating substantially one-half the surface area of the base member.

The remaining surface area of the base member 10 is entirely exposed and is of a dimension sufficient to receive thereover a body of a sheet of conventional letter paper 14. The open side wall of the container before referred to is covered by a transparent member 15 such as a plate of glass, which seats in a guiding groove 16 formed in the base member and cooperates with the walls 11, 12 and 13 to provide the four walls of the container. At its top the container is closed by a cover member 17 having a depending edge flange 18 which engages over the external faces of the respective walls and assists in maintaining the transparent panel 15 in proper vertical position. This cover 17 is adaptable for suitable ornamentation and may be equipped with any desk appliances as desired, preferably having disposed thereon a conventional ball and socket pen holder 19 which is adapted to serve as a handle for manipulating the cover.

The letter carrying portion of the base 10 is formed at some suitable point with a shallow depression 20 normally receiving in seated engagement a depending finger 21 formed at the end of a switch contact lever 22 pivoted as at 23 upon the container, its opposite end 24 being normally held in open contact position spaced from a contact pin 25 by means of a spring element 26 having its ends respectively secured to the switch lever and the wall of the container as shown in Figure 1.

The switch lever is also provided with a finger 27 whereby it may be manually operated and the lever is in electrical contact through a circuit diagrammatically illustrated in Figure 2 with one terminal of an electric light bulb 28 mounted adjacent the side wall 11 of the container. The other terminal of the light bulb is in contact through the circuit with the contact pin 25 hereinbefore referred to so that, as will be apparent, upon closing contact 24—25 the bulb 28 will be eliminated so that the light rays emanating therefrom will be projected laterally across the entire area of the base member, a reflector 29 being provided by the side wall 11 and the light bulb for assisting in directing the light rays. The bulb 28 is of the elongated type having a length sufficient to extend approximately the entire distance between the end walls 12 and 13.

As a means for directing and confining the light rays from the bulb 28 so as to project through the transparent panel 15 as a series of evenly spaced lines across a sheet of letter paper disposed on the letter carrying portion 30 of the base 10, I provide a uniformly spaced series of rectangular filler blocks 21 arranged in side by side parallel spaced relation between the end walls 12 and 13, and having a length sufficient to abut the transparent panel 15 at one end and at the other end to extend in close proximity to the light bulb 28, as best shown in Figure 3. These filler blocks 31 are preferably made of some light material such as wood having plane side faces and as will be apparent, the parallel spacing of these blocks determines the width of the projected light rays which extend as lines across the letter carrying portion of the base. Preferably the blocks are so spaced as to provide light lines of fairly appreciable width so as to be readily distinguishable upon a sheet of letter paper and in the proper spaced relation for writing.

An important feature of the invention resides in the fact that the dispersion of the light rays at the extreme outer end of the letter carrying portion 30 on the side of the unit opposite the light bulb 28, may be controlled by varying the length of the filler blocks 31. In other words if a sharply defined line of light having a clearly discernable length of six inches is required across the portion 30, then each of the filler blocks 31 must be of substantially corresponding length of six inches. The length of the blocks 31 determines the dispersion of the light rays and it will be apparent therefore that the length of the sharply defined lines of light projected over the letter carrying portion 30 is determined and controlled by the length of the filler blocks employed in the container.

When a sheet of letter paper is placed on the letter carrying portion 30, one end will engage under the switch arm 21 and lift the same from the depression 20 closing the contact 24—25 whereby the light bulb 28 is illuminated and a sharply defined uniformly spaced series of lines of light will immediately be projected laterally through the transparent panel 15 across and over the surface of the sheet of letter paper arranged on the portion 30. With these lines of light as a guide, a person may write the desired letter upon the sheet of paper, after which the same is removed and the action of the spring 26 breaks the light circuit so that no unnecessary drainage is placed upon the current supply. The entire device is made up of attractive design and of light materials so that it is portable and forms an attractive unit substantially of a size of an ordinary desk pad, with the added advantage of being self-contained and shiftable from place to place as desired. It is obvious that the bulb 28 may derive its current from any suitable supply which need not be of the local battery type, and in fact, any structural details of the apparatus may be changed and modified as desired without departing from the spirit of the invention so long as such changes and modifications fall within the scope of the invention as claimed.

I claim:

1. Temporary ruling means for letter paper, comprising a base having a portion formed to receive a sheet of letter paper, a container on said base at one side of said paper holding portion, and means in said container for projecting light rays in sharply defined parallel lines on and across a sheet of paper on said paper holding portion.

2. A stationery appliance comprising, a flat base having a portion adapted to receive a sheet of letter paper, a housing on another portion of the base, an electric light bulb in said housing, shutter means in the housing adjacent said bulb for directing uniform light rays across the letter paper portion of the base, and letter paper controlled switch means for the supply circuit of said light bulb.

3. In combination, a pad adapted to receive thereon a sheet of letter paper, light ray projection apparatus arranged at one side thereof, and a screen associated with said apparatus for directing light rays in sharply defined parallel lines across a sheet of paper on the pad.

4. Temporary ruling means for blank paper, comprising means for supporting a sheet of paper, a light source arranged at one side thereof, and a plurality of blocks of approximately equal length to the width of the sheet of paper arranged in parallel spaced relation between said light source and paper supporting means for directing light rays therebetween in uniform lines across said paper supporting means.

5. Temporary ruling means for blank paper, comprising means for supporting a sheet of paper, a light source arranged at one side thereof, a plurality of blocks arranged in parallel spaced relation between said light source and paper supporting means for directing light rays therebetween in defined lines across said paper supporting means, and control means for said light source operable by paper on said paper supporting means.

6. A stationery appliance comprising a letter sheet holder, a source of light, and means at one side of said holder for directing light rays across the same in parallel spaced paths to simulate ruled lines.

7. A stationery appliance comprising a letter sheet holder, a source of light at one side of the sheet holder, means between said light and the holder for directing light rays in spaced paths across the same, and means for controlling the dispersion of the projected light rays for approximately the width of the letter sheet.

In testimony whereof I affix my signature.

CHARLES J. MENSMAN.